United States Patent
Hogue

Patent Number: 5,974,641
Date of Patent: *Nov. 2, 1999

[54] METHOD OF SHAPING A MUZZLE-LOADING FIREARM BARREL

[76] Inventor: William R. Hogue, 2508 Antioch Church Rd., Clarksville, Tenn. 37040

[*] Notice: This patent is subject to a terminal disclaimer.

[21] Appl. No.: 08/075,602

[22] Filed: Jun. 14, 1993

[51] Int. Cl.⁶ .................................................. B23P 13/02
[52] U.S. Cl. ............................... 29/1.11; 29/1.1; 29/558; 42/76.01; 42/90; 408/1 R; 409/132
[58] Field of Search ............................ 29/1.1, 558, 26 A, 29/1.11; 42/51, 76.01, 78, 90; 408/1 R, 25, 30, 31; 409/132

[56] References Cited

U.S. PATENT DOCUMENTS

| | | |
|---|---|---|
| 338,192 | 3/1886 | Rubin ........................................... 42/78 |
| 1,461,129 | 7/1923 | Loomis ........................................ 29/1.1 |
| 2,323,306 | 7/1943 | Campbell ................................. 42/76.01 |
| 2,464,323 | 3/1949 | Lee .......................................... 29/1.1 X |
| 3,011,404 | 12/1961 | Russell ................................ 42/76.01 X |
| 3,478,417 | 11/1969 | Shaw ........................................... 29/558 |
| 4,527,348 | 7/1985 | Brennan ................................... 42/76 R |

*Primary Examiner*—Joseph M. Gorski

[57] ABSTRACT

A firearm barrel having a barrel bore in a barrel bore entrance end is arranged to receive a conical milling tool directed to shape the conical entrance into the barrel bore entrance end, with a counter-bore drill followed by a second conical milling tool directing an annular seat at an interface of the counter-bore and the conical bore to receive a load tool cylinder onto the seat for ease of directing a charge into the barrel.

1 Claim, 4 Drawing Sheets

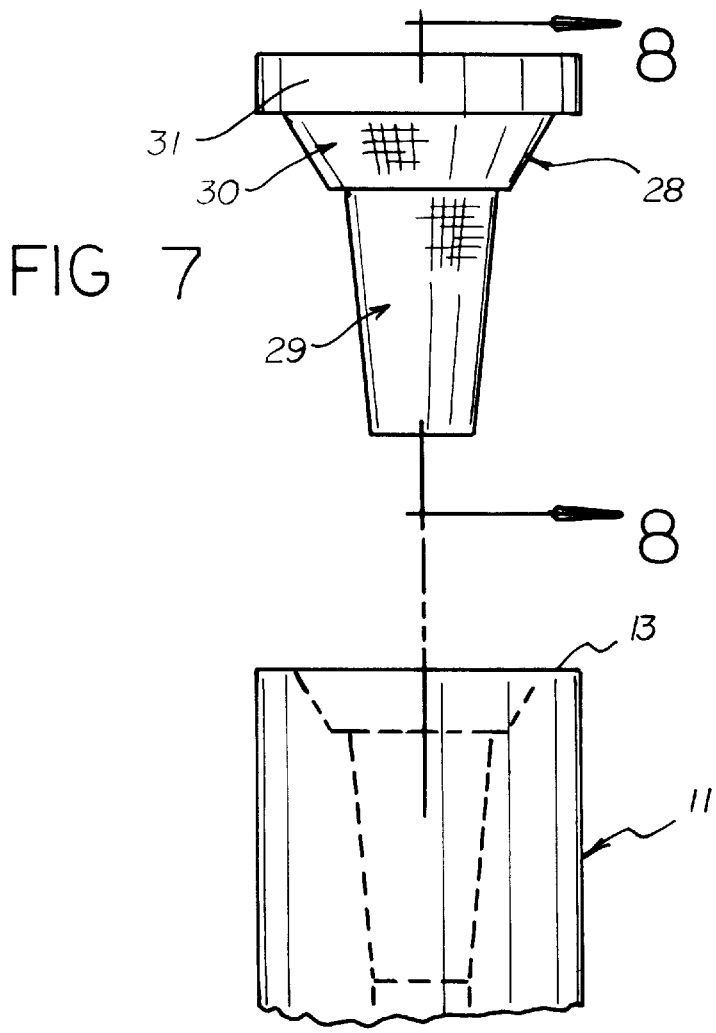
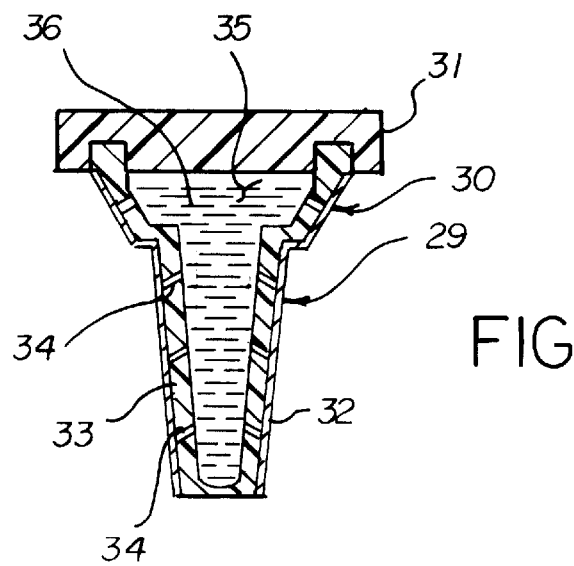

METHOD OF SHAPING A MUZZLE-LOADING FIREARM BARREL

BACKGROUND OF THE INVENTION

1. Field of the Invention

The field of invention relates to firearm barrel construction, and more particularly pertains to a new and improved method of shaping a muzzle-loading firearm barrel to permit ease of loading the firearm barrel.

2. Description of the Prior Art

In the use of muzzle-loading firearms, a gun powder charge followed by a seating wad that is in turn followed by a projectile is directed into the barrel and typically directed into the barrel by a ram tool, such as a rod and the like. During the loading procedure, projectiles due to their malleable construction are subject to deformation. The instant invention attempts to overcome deficiencies of the prior art by configuring the firearm barrel providing for a plurality of coaxially aligned conical bore portions extending a predetermined depth into the barrel from its entrance end to avoid projectile deformation and ease of loading of the firearm and in this respect, the present invention substantially fulfills this need.

SUMMARY OF THE INVENTION

In view of the foregoing disadvantages inherent in the known types of muzzle-loading firearm barrel construction now present in the prior art, the present invention provides a method of shaping a muzzle-loading firearm barrel wherein the same is directed to provide for an annular seat at an interface between conical bores. As such, the general purpose of the present invention, which will be described subsequently in greater detail, is to provide a new and improved method of shaping a muzzle-loading firearm barrel which has all the advantages of the prior art muzzle loading barrel construction and none of the disadvantages.

To attain this, the present invention provides a firearm barrel having a barrel bore in a barrel bore entrance end to receive a conical milling tool directed to shape the conical entrance into the barrel bore entrance end, with a counter-bore drill followed by a second conical milling tool directing an annular seat at an interface of the counter-bore and the conical bore to receive a load tool cylinder onto the seat for ease of directing a charge into the barrel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method of shaping a muzzle-loading firearm barrel which has all the advantages of the prior art muzzle-loading barrel construction and none of the disadvantages.

It is another object of the present invention to provide a new and improved method of shaping a muzzle-loading firearm barrel which may be easily and efficiently manufactured and marketed.

It is a further object of the present invention to provide a new and improved method of shaping a muzzle-loading firearm barrel which is of a durable and reliable construction.

An even further object of the present invention is to provide a new and improved method of shaping a muzzle-loading firearm barrel which is susceptible of a low cost of manufacture with regard to both materials and labor, and which accordingly is then susceptible of low prices of sale to the consuming public, thereby making such methods of shaping a muzzle-loading firearm barrel economically available to the buying public.

Still yet another object of the present invention is to provide a new and improved method of shaping a muzzle-loading firearm barrel which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic view indicating the optional employment of an end cap member.

FIG. 8 is an orthographic view, taken along the lines 8—8 of FIG. 7 in the direction indicated by the arrows.

DESCRIPTION OF THE PREFERRED EMBODIMENT

Figure 1:
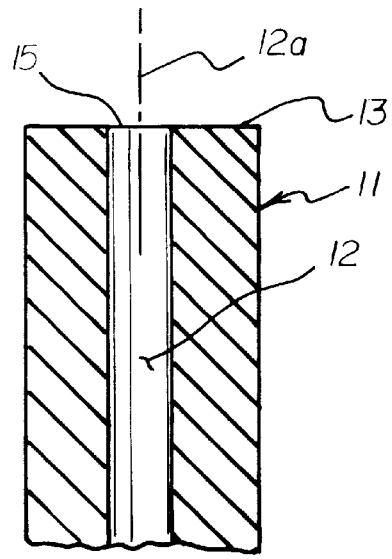
FIG. 1 is an orthographic view of the end portion of a muzzle-loading barrel.
Figure 2:
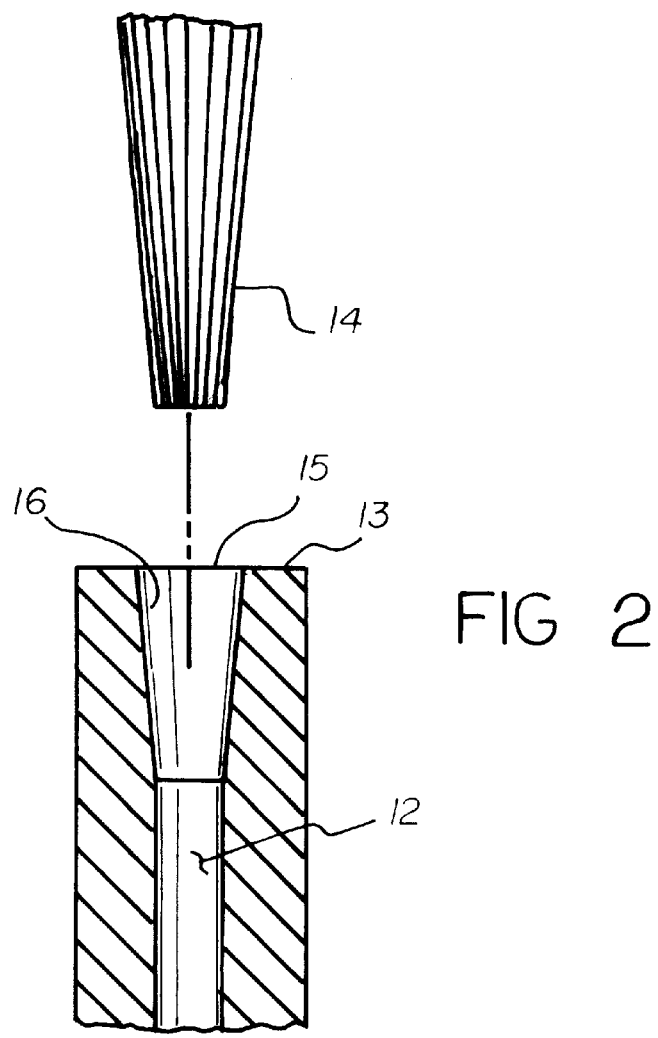
FIG. 2 is an orthographic cross-sectional illustration of a first step in the forming of the barrel entrance end.

With reference now to the drawings, and in particular to FIGS. 1 to 8 thereof, a new and improved method of shaping a muzzle-loading firearm barrel embodying the principles and concepts of the present invention and generally designated by the reference numerals 11–36 will be described.

More specifically, the method of shaping a muzzle-loading firearm barrel of the invention essentially comprises the provision of a barrel member 11, having a barrel bore 12 coaxially aligned along a barrel bore axis 12a, having a barrel distal end wall 13 typically orthogonally oriented relative to the axis 12a. A first conical milling tool 14 is provided received within the barrel bore at the bore entrance end 15 coplanar with the end wall 13 shaping a truncated conical entrance bore 16 directed into the barrel bore 12 a predetermined depth. Typically, the predetermined depth is equal to 1.5 inches, but it is understood that such depth may vary dependent upon caliber of projectile employed. To this end, a modified entrance end 15a is thereby shaped, having a predetermined second diameter greater than a predetermined first diameter of the bore entrance 15.

Figure 3:
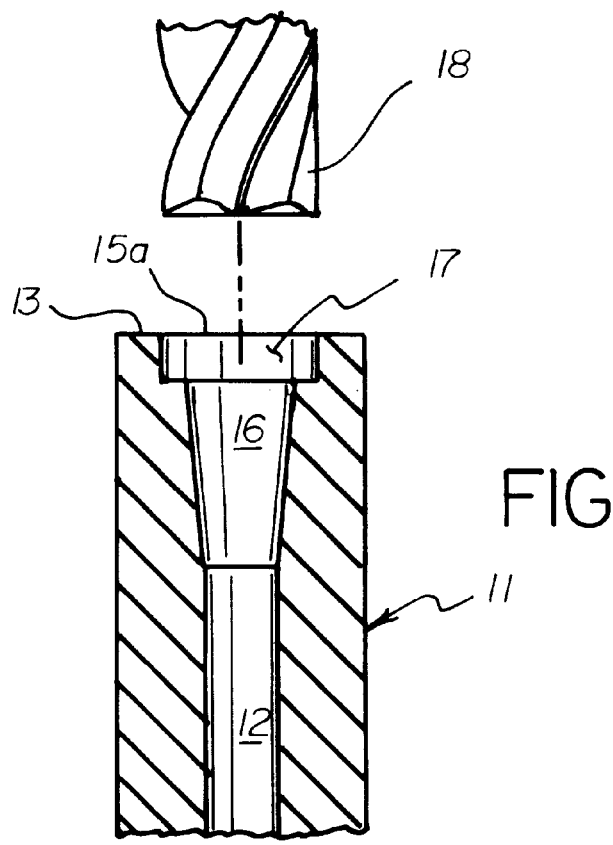
FIG. 3 is an orthographic cross-sectional illustration of a second step in the barrel forming.
Figure 4:
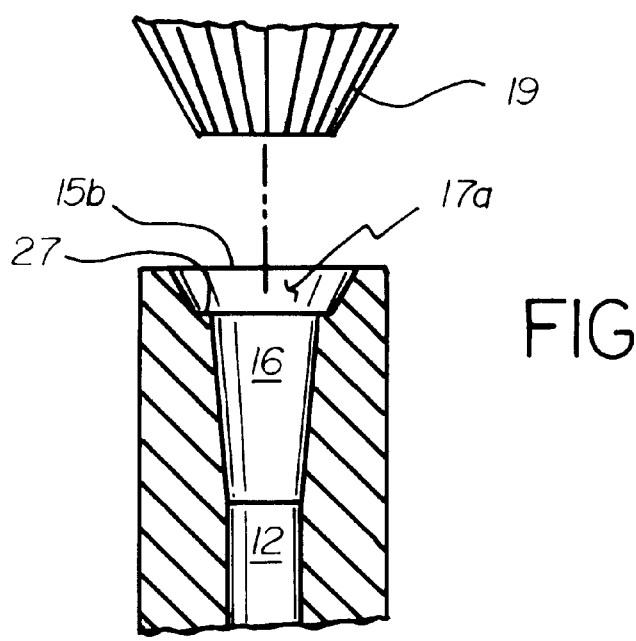
FIG. 4 is an orthographic cross-sectional illustration employing a second milling tool forming the second conical bore portion.
Figure 5:
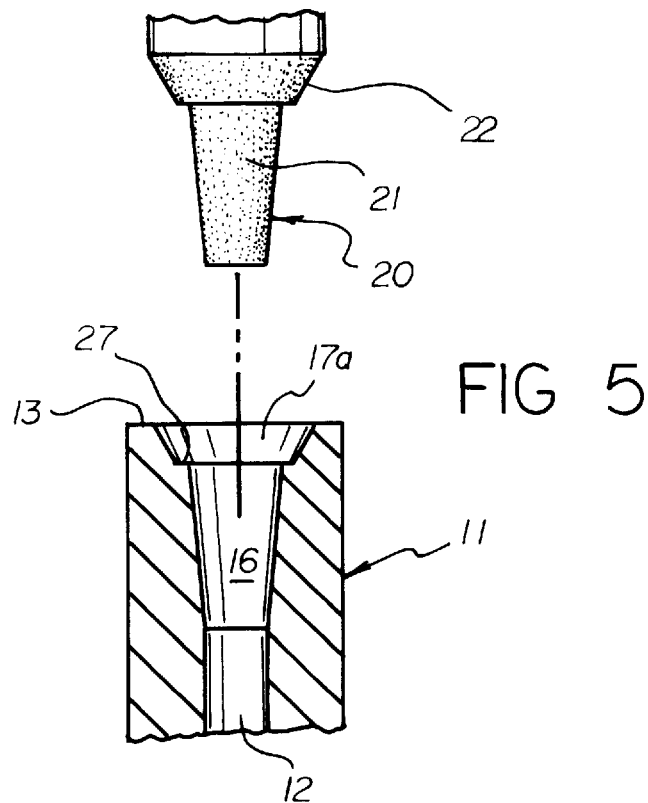
FIG. 5 is an orthographic cross-sectional illustration indicating the polishing of the conical bore portions.

FIG. 3 illustrates the use of a counter-bore drill 18 directed coaxially into the conical entrance bore 16, having a diameter substantially equal to the second diameter, and having a depth of projection into the entrance bore 16 substantially less than the predetermined depth shaping a counter-bore 17 of cylindrical configuration, whereupon a second milling tool 19 (see FIG. 4) is coaxially directed into the counter bore 17 to provide for a modified counter-bore 17a of truncated conical configuration shaping a bore entrance 15 having a third diameter greater than the second diameter, and shaping an annular seat 27 at an interface between the modified counter-bore 17a and the entrance bore 16. A polishing tool 20 is provided, having a polishing tool first portion 21 complementarily and coextensively received within the entrance bore 16, and a polishing tool second portion 22 complementarily received within the modified counter-bore 17a.

Figure 6:
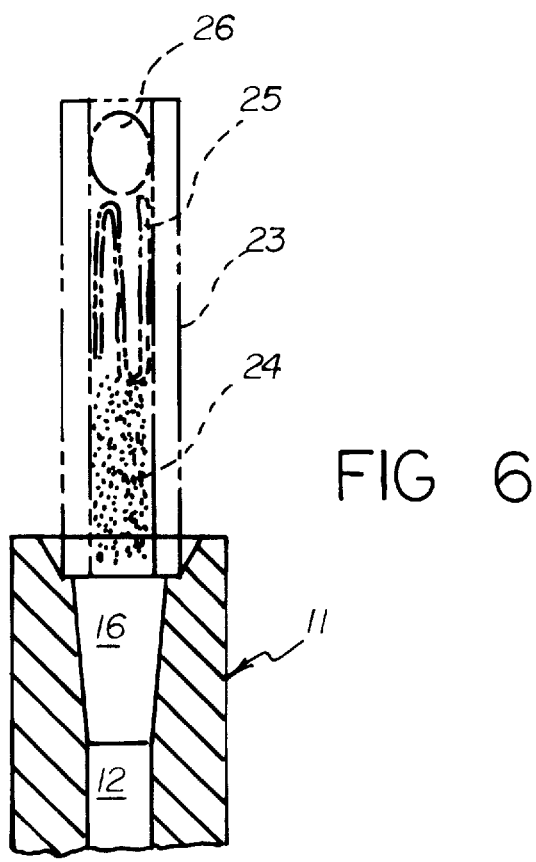
FIG. 6 is an orthographic view indicating positioning of the loading tool in association with the modified firearm barrel.

FIG. 6 indicates the manner of the use of a load tool cylinder 23 containing therewithin a gun powder 24 followed by a flexible wad 25 and a projectile bullet 26 that are typically rammed into the barrel bore 12 through the entrance bore 16 employing the modified counter-bore 17a of the conical configuration providing for ease of positioning the load tool cylinder 23 onto the annular seat 27.

The FIGS. 7 and 8 indicates the use of a cap assembly 28, having a cap conical first portion 29 complementarily received within the entrance bore 16, and a cap conical second portion 30 complementarily received within the modified conical counter-bore 17a such that a cap head 31 effects enclosing of a fluid cavity 35 within the cap, wherein a porous web 32 is arranged in surrounding relationship relative to the flexible cap wall 33 surrounding the cap first and second portions 29 and 30. Fluid conduits 34 are in fluid communication between the porous web 32 mounted coextensively about the cap wall 33 and a lubricant 36 contained within the fluid cavity 35. In this manner, continuous lubrication preventing corrosion while enhancing ease of charging the thusly shaped barrel member 11 is provided.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of producing a muzzle-loading firearm barrel, comprising the steps of:

provided a barrel member having a barrel bore of uniform diameter extending from an end wall of said barrel member from which projectiles are to exit to a predetermined distance into said barrel member, wherein said barrel member and barrel bore have co-axial central axes;

providing a first conical milling tool increasing in diameter away from a first end thereof wherein at least a portion of said first conical milling tool is of a greater diameter than that of said barrel bore;

rotating said first conical milling tool while forcing it into said barrel member from said end wall with a central axis of said first conical milling tool aligned with the central axis of said barrel bore, thereby shaping a portion of said barrel member into a conical entrance bore decreasing in diameter from said end wall to a first predetermined depth into said barrel member;

providing a counterbore drill having a uniform diameter that is greater in diameter than the diameter of said conical entrance bore at said end wall;

rotating said counterbore drill while forcing it against said end wall and into said barrel member with a central axis of said counterbore drill aligned with the central axis of said barrel bore, thereby shaping a portion of said barrel member into a cylindrical counter-bore of uniform diameter from said end wall to a second predetermined depth into said barrel member, wherein said second predetermined depth is less than said first predetermined depth:

providing a second conical milling tool increasing in diameter away from a first end thereof, wherein at least a portion of said second conical milling tool is of a greater diameter than that of said cylindrical counterbore; and rotating said second conical milling tool while forcing it into said barrel member from said end wall with a central axis of said second conical milling tool aligned with the central axis of said barrel bore, thereby shaping a portion of said barrel member into a conical entrance portion decreasing in diameter from said end wall to a third predetermined depth into said barrel member, wherein said third predetermined depth is equal to said second predetermined depth.

\* \* \* \* \*